(12) United States Patent
Shammoh

(10) Patent No.: US 8,614,886 B1
(45) Date of Patent: Dec. 24, 2013

(54) STAND FOR CONVERTING LAPTOP COMPUTER TO DESKTOP COMPUTER

(71) Applicant: Ali A. A. J. Shammoh, Al-Adan (KW)

(72) Inventor: Ali A. A. J. Shammoh, Al-Adan (KW)

( * ) Notice: Subject to any disclaimer, the term of this patent is extended or adjusted under 35 U.S.C. 154(b) by 0 days.

(21) Appl. No.: 13/894,320

(22) Filed: May 14, 2013

(51) Int. Cl.
*G06F 1/16* (2006.01)
*H05K 5/00* (2006.01)
*H05K 7/00* (2006.01)

(52) U.S. Cl.
CPC ..................................... *G06F 1/162* (2013.01)
USPC ................................. 361/679.41; 361/679.02

(58) Field of Classification Search
CPC ..................................................... G06F 1/162
USPC ............. 361/679.41, 679.02; 248/158, 181.2, 248/176.1; 108/44, 152
See application file for complete search history.

(56) References Cited

U.S. PATENT DOCUMENTS

| | | | |
|---|---|---|---|
| 5,769,369 A * | 6/1998 | Meinel | 248/176.1 |
| 6,021,720 A * | 2/2000 | Boos et al. | 108/44 |
| 7,515,405 B2 * | 4/2009 | Lev et al. | 361/679.55 |
| 2004/0090742 A1 * | 5/2004 | Son et al. | 361/686 |
| 2008/0062624 A1 | 3/2008 | Regen et al. | |
| 2008/0074842 A1 * | 3/2008 | Tracy et al. | 361/695 |
| 2011/0075350 A1 * | 3/2011 | Lindblad et al. | 361/679.41 |
| 2011/0135133 A1 | 6/2011 | Choi et al. | |

* cited by examiner

*Primary Examiner* — Yuriy Semenenko
(74) *Attorney, Agent, or Firm* — Richard C. Litman

(57) ABSTRACT

The stand for converting a laptop computer to a desktop computer includes a base having a support column attached thereto. The support column has an attachment head that includes hanger devices for attachment to a rear surface of a computer cover that has been modified to receive the hanger devices. Thus, the laptop computer may optionally be used with or without the stand.

5 Claims, 4 Drawing Sheets

STAND FOR CONVERTING LAPTOP COMPUTER TO DESKTOP COMPUTER

BACKGROUND OF THE INVENTION

1. Field of the Invention

The present invention generally relates to supports, and particularly to a stand for converting a laptop computer to a desktop computer.

2. Description of the Related Art

The advent of the age of worldwide, instant, information transmittal and retrieval requires that the business executive, engineer, scientist, etc. have access to a computer at all times. The laptop portable computer fills this requirement. In many instances, however, the work environment is best suited for a desktop computer. As is often the case, a desktop computer is employed in a home or office setting, and a laptop computer is utilized in the field or while traveling. This scenario can be rather costly in that the purchase of two computers must be absorbed by the company or individual. It would certainly be less expensive and more efficient if a single computer could be adapted to function as both a laptop and a desktop. Thus, a stand for converting a laptop to a desktop computer solving the aforementioned problems is desired.

SUMMARY OF THE INVENTION

The stand for converting a laptop computer to a desktop computer comprises a base having a support column attached thereto. The support column includes hanger devices on the front face for attachment to a rear surface of a computer cover that has been modified to receive the hanger devices.

Accordingly, the invention presents a stand that can be utilized to quickly and efficiently convert a laptop computer for use as a desktop. The stand is of one-piece design with no moving parts. The stand is fabricated from any rigid, suitable material (wood, metal, plastic, etc.) capable of supporting the weight of a conventional laptop computer. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
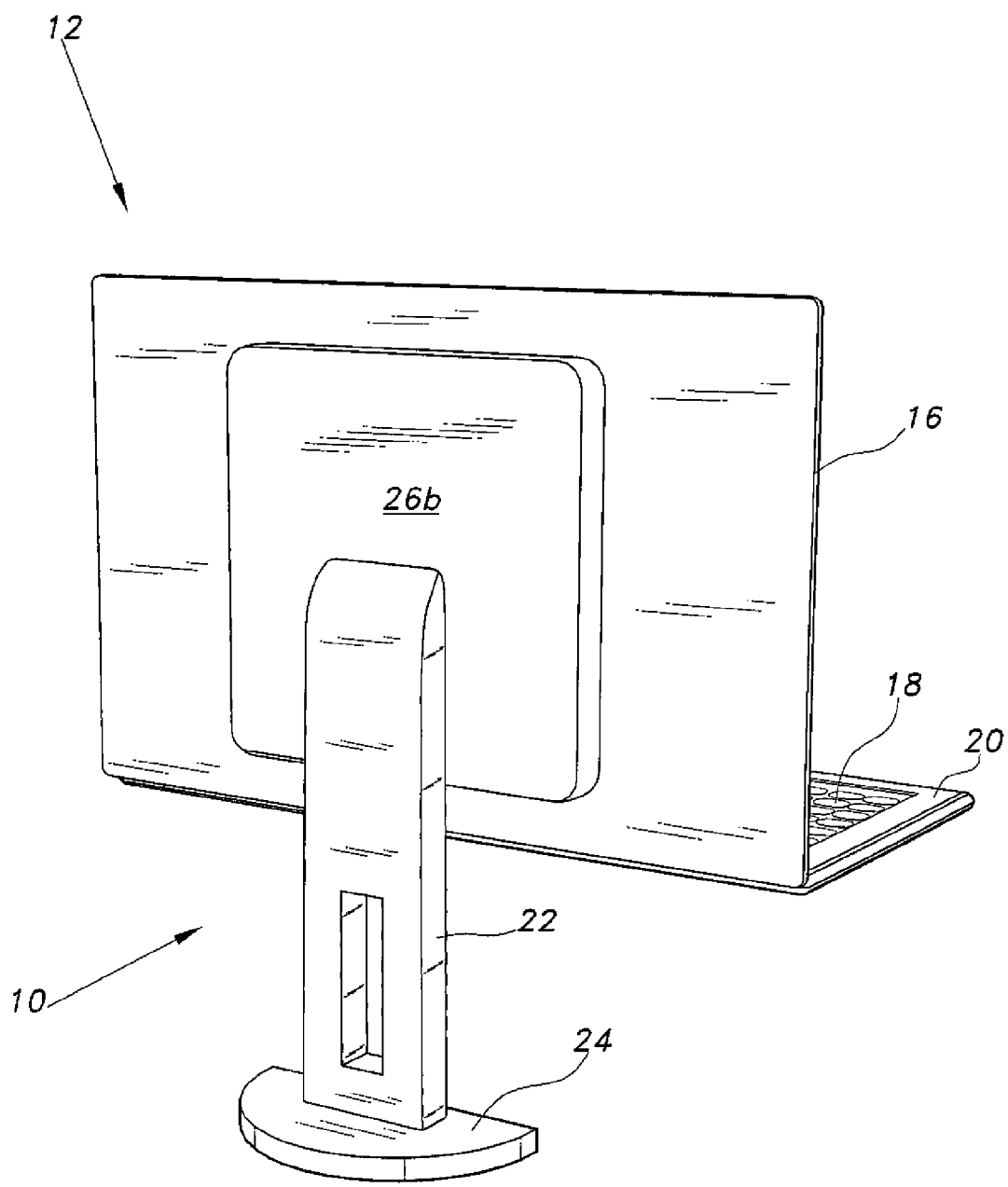
FIG. 1 is an environmental perspective view of a stand for converting a laptop computer to a desktop computer according to the present invention.
Figure 2:
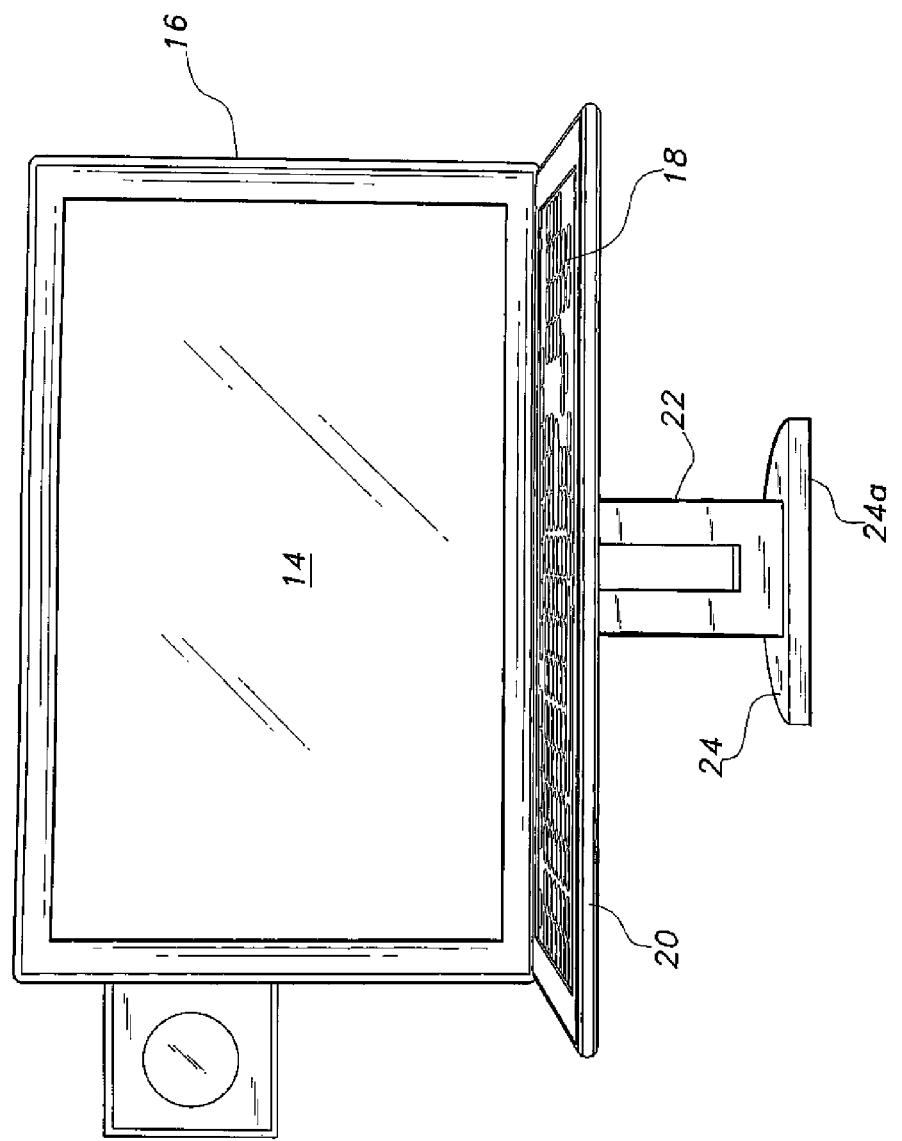
FIG. 2 is an environmental, front view of the stand of FIG. 1.
Figure 3:
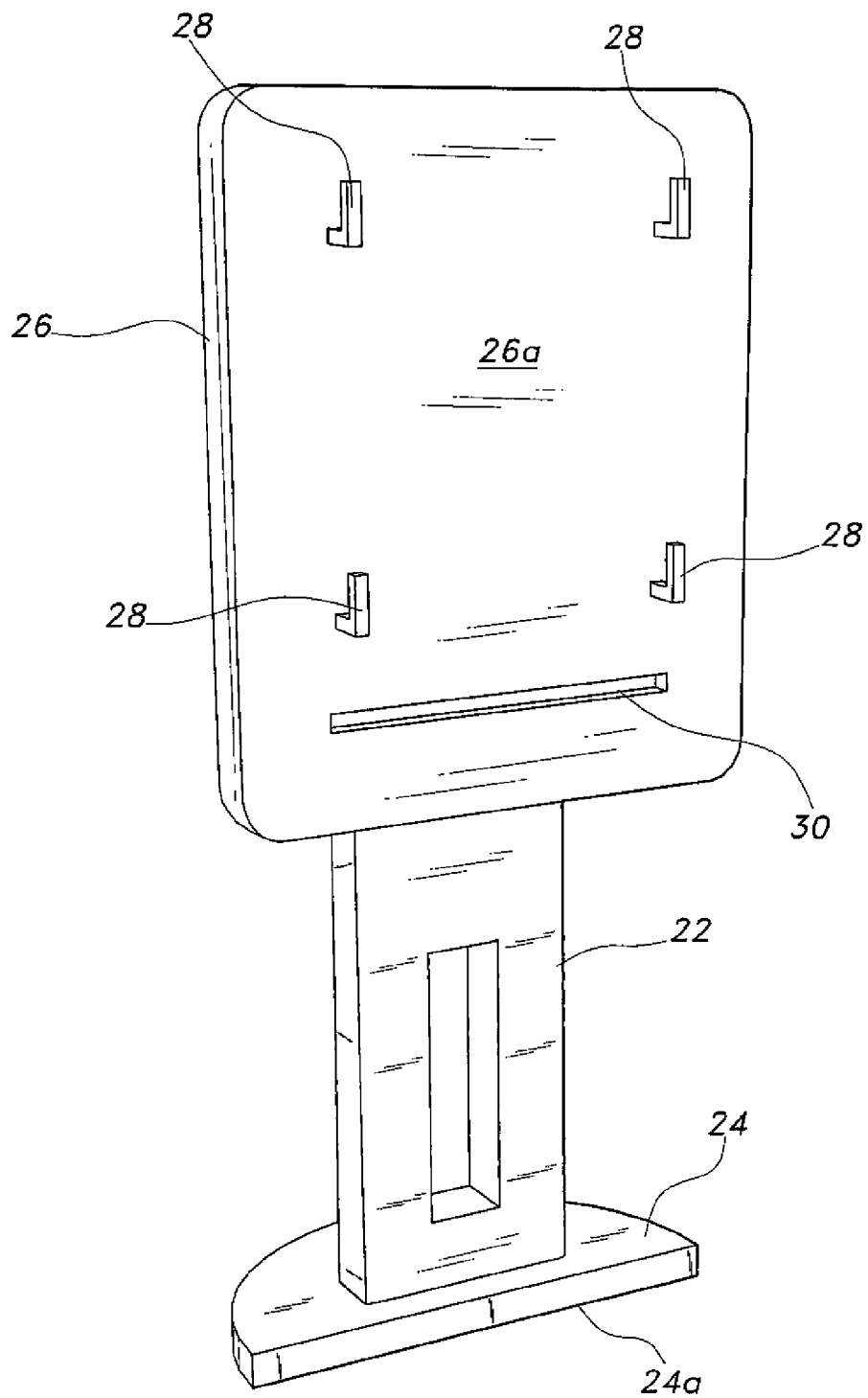
FIG. 3 is a perspective view of the stand of FIG. 1.
Figure 4:
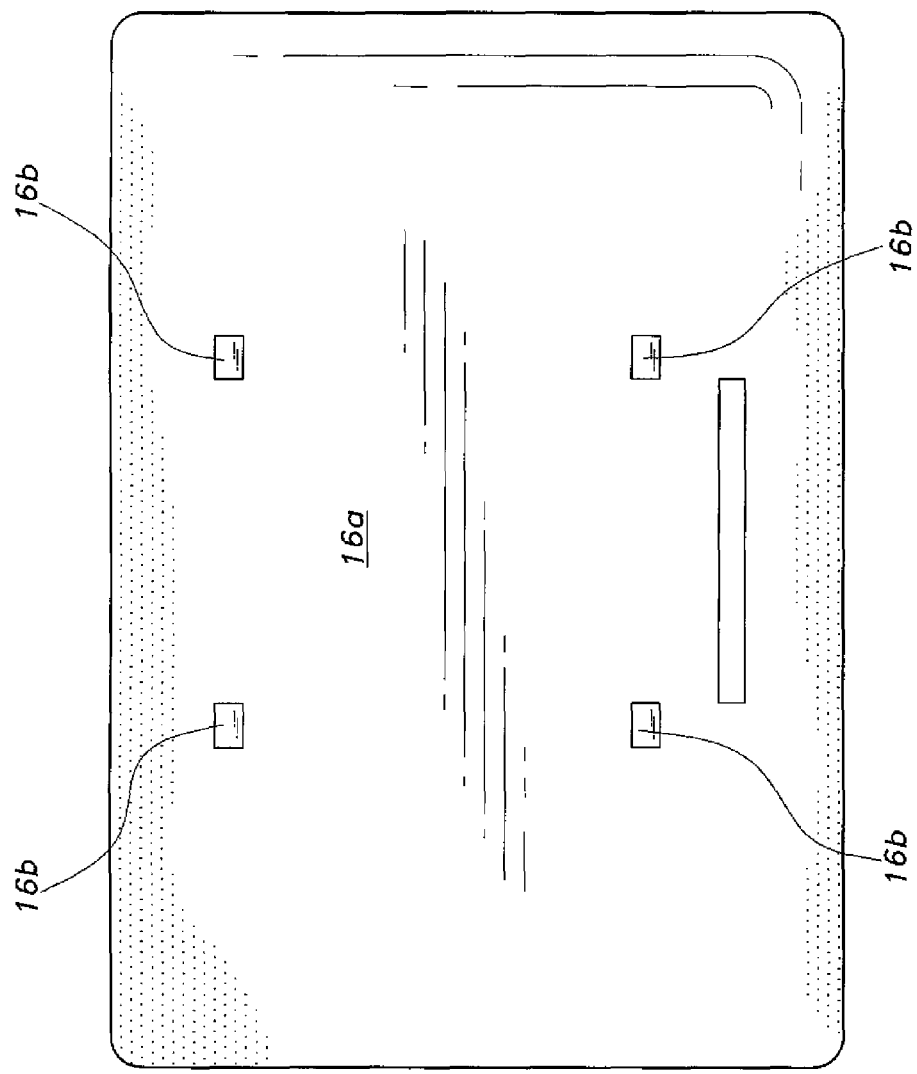
FIG. 4 is a partial rear view of a laptop computer modified to receive the stand of FIG. 1.

Referring to FIGS. 1-4, the stand for converting a laptop computer to a desktop computer is generally indicated at 10. The stand 10 is adapted to removably support a laptop computer 12 thereon. The computer 12 may incorporate a printer and scanner and includes a conventional screen 14, which is mounted on the inner face of a cover member 16, and a keyboard 18 mounted on the inner face of a second cover member 20. The cover member 16 has a rear face 16*a* having a plurality of openings 16*b*, which are preferably arranged in a symmetrical pattern on the rear face 16*a* of the cover member 16 for reasons explained below.

The stand comprises a support column 22 having a lower end terminating in a base or foot portion 24 having a planar bottom surface 24*a*. An attachment head 26 defines the upper end of the column 22. The head 26 is provided with a front face 26*a* and a rear face 26*b*. A plurality of L-shaped hanger members 28 is arranged in a symmetrical pattern on the front face 26*a*. The symmetrical pattern for members 28 is identical to the symmetrical pattern of openings 16*b*, whereby the openings 16*b* may receive the hanger members 28 therein. A slotted opening 30 is provided through the head 26 to accommodate paper flow from the computer.

Conversion from laptop to desktop may be accomplished quickly and easily. The attachment head 26 is positioned so that the L-shaped members 28 are aligned with the openings 16*b*. Insertion of the L-shaped members therein will secure the laptop to the stand 10 for use as a desktop.

It is to be understood that the present invention is not limited to the embodiments described above, but encompasses any and all embodiments within the scope of the following claims.

I claim:

1. A computer convertible from a laptop computer configuration to a desktop computer configuration, comprising:
    a laptop computer having a cover member, the cover member having a rear face, wherein a plurality of openings are formed in the rear face of the cover member;
    a support column member having an upper end and a lower end;
    an attachment head mounted on the upper end of the support column member, the attachment head having a front face; and
    means for removably attaching the upper end of the support column member to the rear face of the cover member, the means for removably attaching includes a plurality of L-shaped hanger members disposed on the front face of the attachment head, the hanger members releasably engaging the openings in the rear face of the laptop computer cover member in order to support the laptop computer on the support column member.

2. The computer according to claim 1, further comprising a foot portion attached to the lower end of said support column member, the foot portion having a planar undersurface.

3. The computer according to claim 1, wherein the rear face of said cover member has a plurality of openings defined therein.

4. A device for converting a laptop computer to a desktop computer, comprising:
    a laptop computer having a cover member, the cover member having a rear face, the rear face having a plurality of openings defined therein arranged in a symmetrical pattern;
    a support column member having an upper end, a lower end, and a foot portion at the lower end of the support column member, the foot portion having a planar undersurface;
    an attachment head mounted on the upper end of the support column member, the attachment head having a front face and a slot formed therein for the passage of paper therethrough; and
    a plurality of L-shaped hanger members disposed on the front face of the attachment head, the L-shaped hanger members being arranged in a symmetrical pattern identical to the openings in the rear face of the laptop cover column member, the laptop cover member being releasably mountable on the attachment head of the support column, whereby the laptop computer is optionally supported by the support column member.

5. A device for converting a laptop computer to a desktop computer comprising:

a support column member having an upper end, a lower end, and a foot portion at the lower end, the foot portion having a planar undersurface;

an attachment head mounted on the upper end of the support column member, the attachment head having a front face, a peripheral edge and a slot formed therein for the passage of paper therethrough, the support column member and the attachment head defining a stand; and a plurality of L-shaped hanger members disposed solely on the front face of the attachment head and located symmetrically adjacent and spaced from the peripheral edge in a symmetrical pattern.

\* \* \* \* \*